(12) United States Patent
Bantiles et al.

(10) Patent No.: US 10,407,006 B2
(45) Date of Patent: Sep. 10, 2019

(54) REDUNDANT SUPPLY FOR A CAN TRANSCEIVER OF A MOTOR VEHICLE AND METHODS OF USE THEREOF

(71) Applicant: Valeo North America, Inc., Troy, MI (US)

(72) Inventors: Sergio Bantiles, Troy, MI (US); Beniamin Dragoi, Troy, MI (US)

(73) Assignee: Valeo North America, Inc., Troy, MI (US)

( * ) Notice: Subject to any disclaimer, the term of this patent is extended or adjusted under 35 U.S.C. 154(b) by 84 days.

(21) Appl. No.: 15/656,367

(22) Filed: Jul. 21, 2017

(65) Prior Publication Data

US 2019/0023202 A1 Jan. 24, 2019

(51) Int. Cl.

| | |
|---|---|
| *B60R 16/033* | (2006.01) |
| *H02J 1/14* | (2006.01) |
| *H02M 3/04* | (2006.01) |
| *B60R 16/023* | (2006.01) |
| *H04L 12/40* | (2006.01) |
| *H04B 1/40* | (2015.01) |
| *F02N 11/08* | (2006.01) |

(Continued)

(52) U.S. Cl.
CPC .......... *B60R 16/033* (2013.01); *B60R 16/023* (2013.01); *B60R 16/03* (2013.01); *F02N 11/0814* (2013.01); *H02J 1/14* (2013.01); *H02J 9/00* (2013.01); *H02M 3/04* (2013.01); *H04B 1/40* (2013.01); *H04L 12/40* (2013.01); *H04L 12/40006* (2013.01); *H04L 2012/40215* (2013.01); *H04L 2012/40273* (2013.01)

(58) Field of Classification Search
CPC ........ H02M 3/156; H02M 3/158; H02M 1/08; B60R 16/0315; B60R 16/03; B60R 16/023; B60R 16/033; B60Q 9/00; H04B 5/02

USPC .................. 307/10.1, 10.2, 9.1, 10.5, 66, 64
See application file for complete search history.

(56) References Cited

U.S. PATENT DOCUMENTS

| | | | | |
|---|---|---|---|---|
| 4,095,184 | A | * | 6/1978 | Hochstein ................ H04B 1/44 455/127.1 |
| 4,486,722 | A | * | 12/1984 | Landt ....................... H03H 7/40 327/503 |

(Continued)

OTHER PUBLICATIONS

The International Search Report issued in corresponding International Application No. PCT/US2018/042989, dated October 15, 2018 (11 pages).

*Primary Examiner* — Fritz M Fleming
*Assistant Examiner* — Jagdeep S Dhillon
(74) *Attorney, Agent, or Firm* — Osha Liang LLP

(57) ABSTRACT

A system for a controller area network (CAN) transceiver of a motor vehicle including a main power supply, the main power supply being unregulated, a secondary power supply set above a minimum operating voltage of the CAN transceiver, the secondary power supply being regulated, a first diode, the first diode allowing the main power supply to power the CAN transceiver, a second diode, the second diode allowing the secondary power supply to power the CAN transceiver, wherein when the main power supply has a low cranking voltage below a normal operating voltage range, the first diode is reverse bias and the second diode is forward bias at the low cranking voltage, the secondary power supply powers the CAN transceivers at the low cranking voltage, thereby allowing the CAN transceiver to remain ON at the low cranking voltage.

15 Claims, 3 Drawing Sheets

(51) Int. Cl.
*B60R 16/03* (2006.01)
*H02J 9/00* (2006.01)

(56) References Cited

U.S. PATENT DOCUMENTS

| | | |
|---|---|---|
| 2004/0017113 A1 | 1/2004 | Xing et al. |
| 2005/0038585 A1 | 2/2005 | Asaumi et al. |
| 2009/0179627 A1 | 7/2009 | Innami et al. |
| 2016/0001675 A1 | 1/2016 | Kazuno et al. |
| 2017/0149332 A1* | 5/2017 | Tanigawa ................ B60R 16/02 |
| 2018/0126926 A1* | 5/2018 | Dremel ................ B60R 16/023 |
| 2018/0344545 A1* | 12/2018 | Khafagy ............... B60P 1/4471 |

* cited by examiner

REDUNDANT SUPPLY FOR A CAN TRANSCEIVER OF A MOTOR VEHICLE AND METHODS OF USE THEREOF

BACKGROUND

Development of a controller area network (CAN) began in the 1980s and was published by the International Organization for Standardization (ISO). The CAN is applied under harsh conditions of electrical transmitting for providing a stable transmission. Therefore, a CAN is usually applied on, for example, a control system of vehicles, aerospace, maritime, industrial automation and medical equipment.

A transceiver is a device comprising both a transmitter and a receiver that are combined and share common circuitry or a single housing. Additionally, the transceiver can be a controller area network (CAN) transceiver. The CAN transceiver is a vehicle bus standard designed to allow microcontrollers and devices to communicate with each other in applications without a host computer. The CAN transceiver is a message-based protocol, designed originally for multiplex electrical wiring within automobiles, but is also used in many other contexts. Additionally, the automobiles may also be understood to be a car, sport utility vehicle or suburban utility vehicle (SUV), or any known automobile in the art. Specifically in automobiles, automobile may have as many as 70 electronic control units (ECU) for various subsystems, such as the engine control unit, transmission, airbags, antilock braking/ABS, cruise control, electric power steering, audio systems, power windows, doors, mirror adjustment, battery and recharging systems for hybrid/electric cars, etc. Some of these form independent subsystems, but communications among each other are essential. As such, a subsystem may need to control actuators or receive feedback from sensors, and thus, the CAN transceiver was devised to fill this need. The CAN transceiver allows interconnections between different vehicle systems for a wide range of safety, economy and convenience features to be implemented. If The CAN transceiver is not used and such features were "hard-wired" using traditional automotive electrics, the "hard-wired" functionality would add cost and complexity.

As discussed above, the CAN transceiver may be used in various systems of automobiles. For example, when the automobiles have an auto start/stop feature, various sensor inputs from around the automobile (speed sensors, steering angle, air conditioning on/off, engine temperature) are collated via the CAN transceiver to determine whether the engine can be shut down when stationary for improved fuel economy and emissions. In another instance, the CAN transceivers are used with the electric park brakes. As such, the "hold" functionality of the electric park brakes takes input from the car's tilt sensor (may also be used by the burglar alarm) and the road speed sensors (may also be used by the ABS, engine control and traction control) via the CAN transceivers to determine if the car is stopped on an incline. Similarly, inputs from seat belt sensors (part of the airbag controls) are fed from the CAN transceivers to determine if the seat belts are fastened, so that the parking brake may automatically release upon moving off. Additionally, when the driver engages reverse gear, the transmission control unit can send a signal via the CAN transceivers in the parking assist systems to activate both the parking sensor systems.

SUMMARY OF DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, the invention relates to a system for a controller area network (CAN) transceiver of a motor vehicle including a main power supply, the main power supply being unregulated, a secondary power supply set above a minimum operating voltage of the CAN transceiver, the secondary power supply being regulated, a first diode, the first diode allowing the main power supply to power the CAN transceiver, a second diode, the second diode allowing the secondary power supply to power the CAN transceiver, wherein when the main power supply has a low cranking voltage below a normal operating voltage range, the first diode is reverse bias and the second diode is forward bias at the low cranking voltage, the secondary power supply powers the CAN transceivers at the low cranking voltage, thereby allowing the CAN transceiver to remain ON at the low cranking voltage.

In general, in one aspect, the invention relates to a method for using a redundant supply for a controller area network (CAN) transceiver of a motor vehicle, comprising when a voltage of a main power supply is set to a low cranking voltage that is below a normal operating voltage range of the CAN transceiver: changing a first diode from a forward bias to a reversed bias at the low cranking voltage, switching a main switch at the low cranking voltage, transmitting a voltage of a secondary power supply through a second diode that is forward bias and to the CAN transceiver, powering the CAN transceiver using the secondary power supply at the low cranking voltage, the secondary power supply being a regulated power supply, and maintaining an ON status of the CAN transceiver at the low cranking voltage, wherein the CAN transceiver controls a main switch during an engine cranking event.

DETAILED DESCRIPTION

Figure 1:
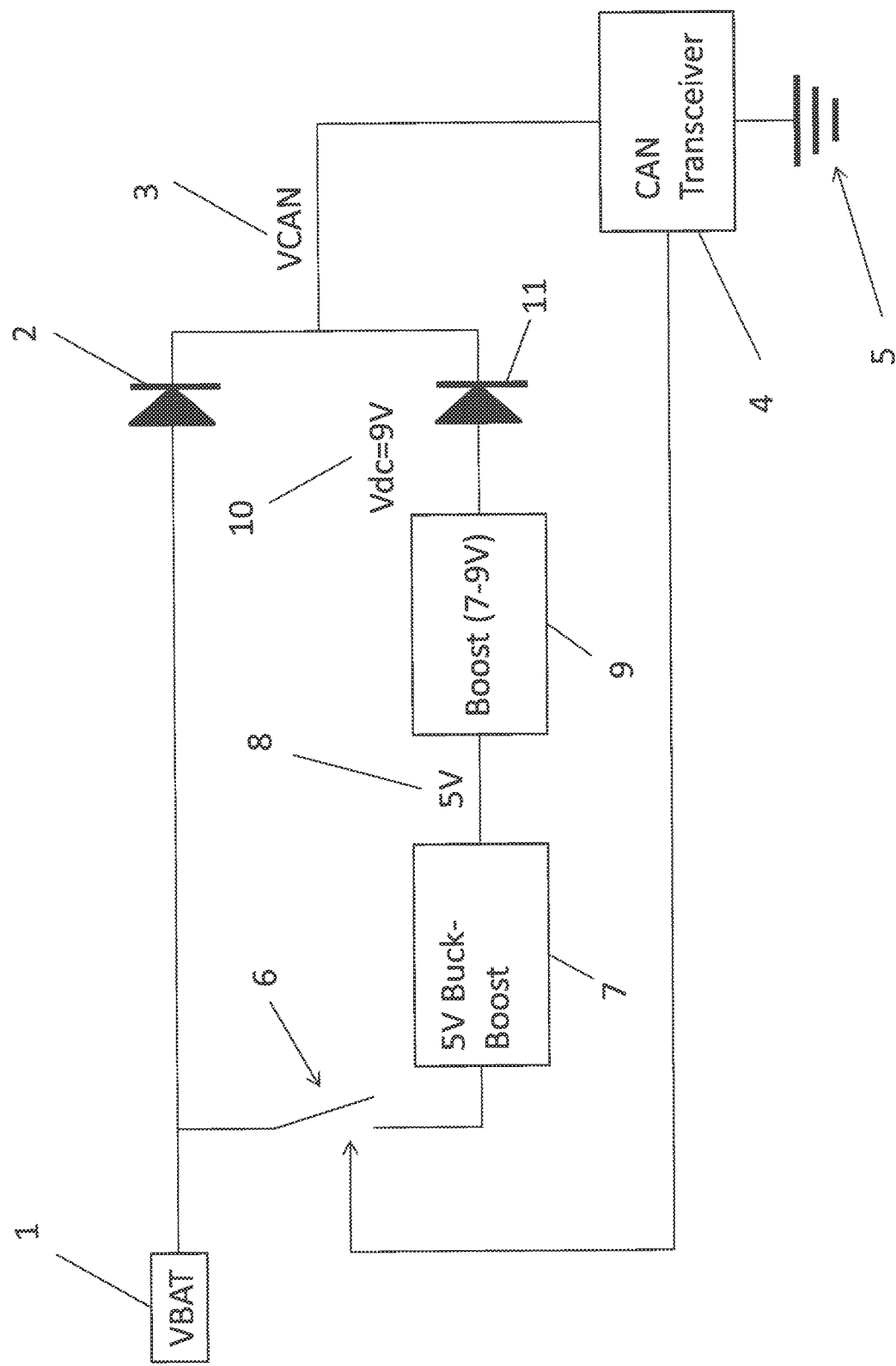
FIG. 1 illustrates a schematic view of a redundant supply for a CAN transceiver according to one or more embodiments of the present disclosure.

Embodiments of the present disclosure are described below in detail with reference to the accompanying figures. Like elements in the various figures may be denoted by like reference numerals for consistency. Further, in the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

Those skilled in the art would appreciate how the term motor vehicle hereinafter may be understood to be a truck, a car, sport utility vehicle or suburban utility vehicle (SUV), or any known automobile in the art. As used herein, the term "coupled" or "coupled to" or "connected" or "connected to" may indicate establishing either a direct or indirect connection, and is not limited to either unless expressly referenced as such. Wherever possible, like or identical reference numerals are used in the figures to identify common or the same elements. The figures are not necessarily to scale and certain features and certain views of the figures may be shown exaggerated in scale for purposes of clarification.

Embodiments of the invention relate to CAN transceivers that are supplied with power through a battery supply voltage ($V_{BAT}$). In one or more embodiments, the $V_{BAT}$ is the only power source for the CAN transceiver and operates at a minimum operating voltage range of 6 volts. However, an engine of a motor vehicle may having a cranking event to produce a low cranking voltage below the minimum operating voltage range of 6 volts. In such a case, the CAN transceivers will not operate properly and not remain ON during the low cranking voltage (motor vehicles with an automatic start/stop feature may be at a further risk). The present disclosure, in one or more embodiments, provides a redundant power supply to the CAN transceiver at the low cranking voltage. Specifically, in one or more embodiments, the CAN transceiver is powered by a secondary power supply configured to remain ON even below cranking voltage.

Turning to FIG. 1, a main power supply for a CAN transceiver 4 is supplied by two power sources, a $V_{BAT}$ 1 (main power supply) and a boost converter 9 (secondary power supply). The $V_{BAT}$ supply is an unregulated DC supply supplied from either an ignition (IGN) switch or battery (e.g., $V_{BAT}$ 1). When the CAN transceiver 4 is at a normal operating voltage range of 9 to 18 volts (from the $V_{BAT}$ 1), a first diode 2 is forward bias and allows the main power supply (i.e., the $V_{BAT}$ 1) to power the CAN transceiver 4. Furthermore, at the normal operating voltage range of 9 to 18 volts, a second diode 11 is reverse bias. In one or more embodiments, the diodes (2, 11) separate the main power source (e.g., $V_{BAT}$ 1) and the secondary power source (7, 9). Once the main power supply (i.e., the $V_{BAT}$ 1) travels through the first diode 2, a VCAN 3 transmits power from the main power supply (i.e., the $V_{BAT}$ 1) to the CAN Transceiver 4. One of skilled in the art will appreciate how the VCAN 3 is a supply rail of the CAN Transceiver 4; thus, at the normal operating voltage range, the VCAN 3 equals the $V_{BAT}$ 1. As shown in FIG. 1, the CAN transceiver 4 may be grounded 5 on an opposite side of the VCAN 3.

Still referring to FIG. 1, in one or more embodiments, a main switch 6 is positioned between the main power supply (i.e., the $V_{BAT}$ 1) and a secondary power supply 7, 9. In one or more embodiments, the secondary power supply may be a 5V Buck-Boost battery 7 and/or boost battery 9. One skilled in the art will appreciate how the Buck-Boost battery 7 may be used to power the boost battery 9 or the CAN transceiver 4. In the event the main power supply (i.e., the $V_{BAT}$ 1) drops below the normal operating voltage range of 9 volts, the first diode 2 switches to a reverse bias and the second diode 11 turns ON (forward bias) allowing boost converter 9 to supply the CAN transceiver 4. In other words, if $V_{BAT}$ 1 drops to, for example, 4.5V, VCAN=boost battery 9. As such, the main switch 6 remains on to continuously power the CAN transceiver 4. Switch 6 will always be ON as long as the CAN transceiver 4 is supplied by one of the two power sources and a valid CAN message is received. Additionally, the 5V Buck-Boost battery 7 produces 5 volts (8) to the boost battery 9 which sends a backup voltage (10) of 7-9 volts through the now forward bias second diode 11. Thus, the 5V Buck-Boost battery 7 maintains a stable 5V for the system, which is boosted to between 7-9V to supply to the CAN transceiver. In one or more embodiments, the second diode 11 is forward bias when the main power source is at a low cranking voltage which is below the minimum operating voltage range. As such, the signal from the secondary power supply 7, 9 may be transmitted through the forward bias second diode 11 to the CAN transceiver 4 with VCAN 3. Those skilled in the art would readily appreciate how the secondary power supply is regulated. Thus, in one or more embodiments, the CAN transceiver 4 is continuously powered and remains ON by either the main power supply at the minimum operating voltage range, or by the secondary power supply when the main power supply is at the low cranking voltage.

Figure 2:
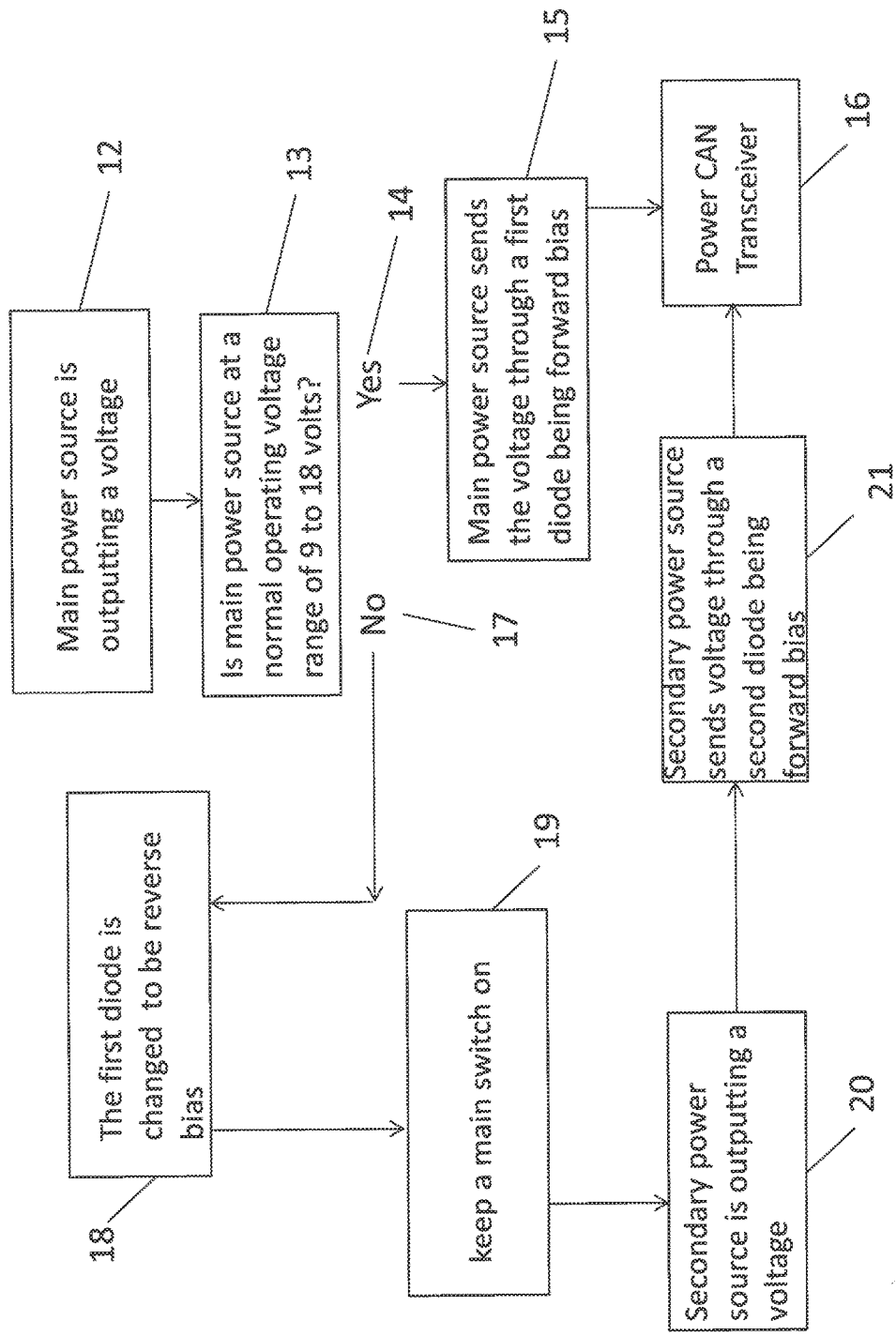
FIG. 2 illustrates a block diagram of using a redundant supply for a CAN transceiver according to one or more embodiments of the present disclosure.

Now referring to FIG. 2, a block diagram of using a redundant supply for a CAN transceiver according to one or more embodiments is shown. For purposes of discussion of FIG. 2, the block diagram is a breakdown of how a CAN transceiver is powered in the present disclosure. In a first step 12, a main power source outputs a voltage. Subsequently, in step 13, a determination is made to as whether the main power source is at a normal operating voltage range of 9 to 18 volts. If it is determined that the decision in step 13 is yes (14), then the process moves to step 15. In step 15, the main power source sends the voltage signal through a first diode that is forward bias. In step 16, the CAN transceiver is powered by the voltage signal transmitted thought the forward bias first diode. As described above, in step 16, the main, unregulated power source is powering the CAN transceiver.

Additionally, as seen by FIG. 2, if the answer to the question imposed in the second step 13 is no (17), i.e., if the main power source is at a low cranking voltage as described in FIG. 1, then the process moves ahead to step 18. In step 18, the main power source being at the low cranking voltage triggers the first diode to be reverse bias. At this stage, subsequently or simultaneously with step 18, a main switch is remained on in step 19.

When the main switch is turned on, a secondary power source outputs a voltage in step 20. Subsequently, the secondary power source sends a voltage signal through a second diode that is forward bias (step 21). Under this configuration, the secondary power source powers the CAN transceiver in step 16. In one or more embodiments, the CAN transceiver remains ON even when the main power source is at a cranking voltage below the normal operating range of the main power source. Thus, for example, if the main power source falls below an operating voltage of 6 volts, the secondary power source is able to supply voltage to the CAN transceiver. This is advantageous because the CAN transceiver remains fully functional during an engine cranking event, for example which may be specifically applicable to systems with an engine start/stop feature. By keeping the CAN transceiver ON, the whole system remains ON since the CAN transceiver controls the main switch.

Figure 3:
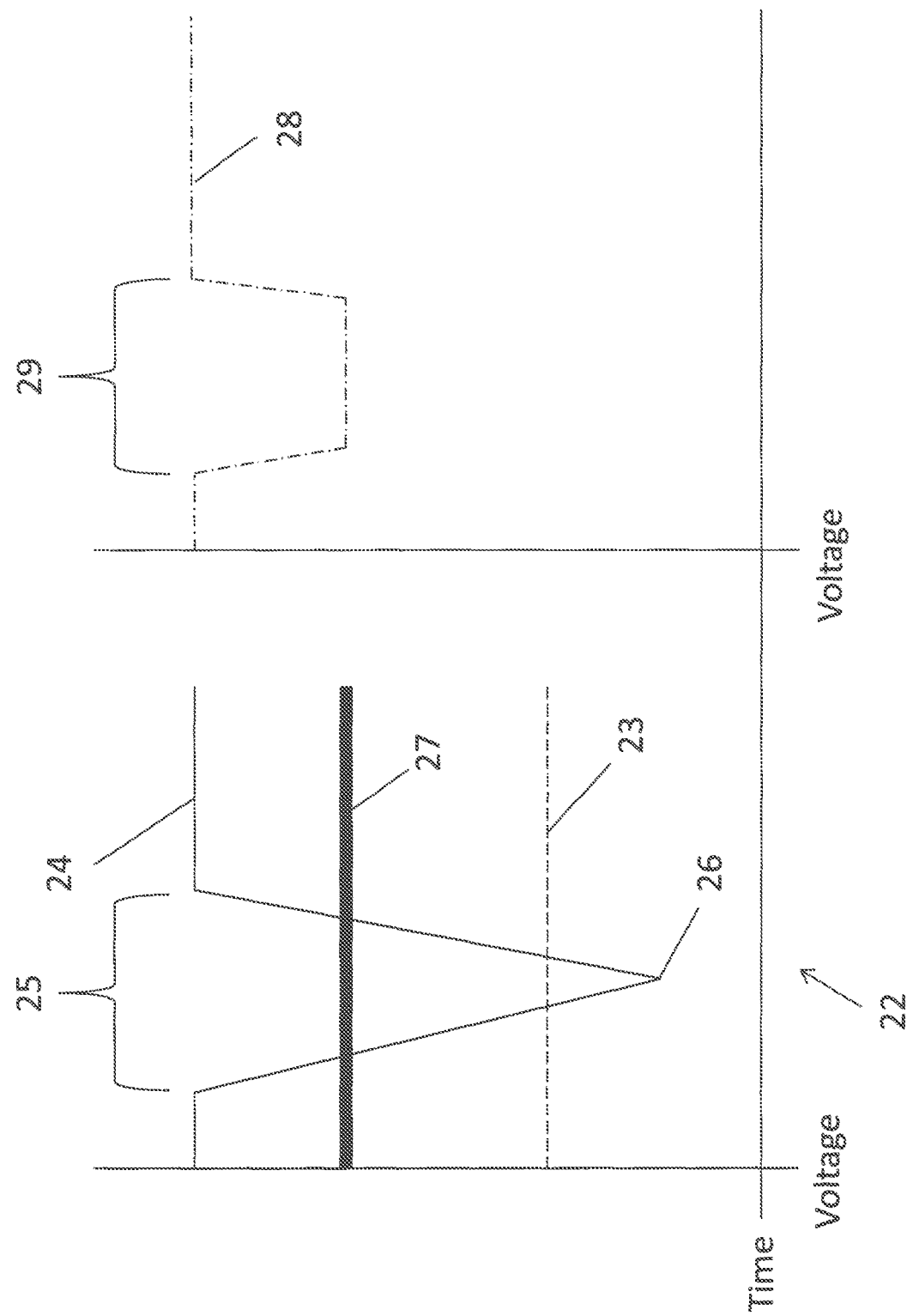
FIG. 3 illustrates a graph of a various power supplies for a CAN transceiver according to one or more embodiments of the present disclosure.

Referring now to FIG. 3, an embodiment illustrating a graph of a various power supplies for a CAN transceiver of the present disclosure is shown. In FIG. 3, a time versus voltage graph 22 is plotted. The graph 22 plots a dotted line 23 to show a minimum voltage of 6 volts to operate a CAN transceiver. The Dotted line 23 is linearly horizontal and has a slope of zero since dotted line 23 has a constant Y-axis valve of 6 volts. Additionally plotted in the graph 22 is a thin line 24 to illustrate a main power source voltage. Typically, the main power source voltage has a slope of zero since dotted line 23 has a constant Y-axis valve of 13.5 volts, as seen when the thin line 24 is linearly horizontal. However, in the case of a cranking event, the main power source voltage drops as represented by a section 25 of the thin line 24. Additionally, a low point 26 of the section 25 of the thin line 24 is typically around 4.5 volts (i.e., the low cranking voltage) which is beneath the minimum voltage of 6 volts to operate a CAN transceiver. As such, the CAN transceiver does not remain on the cranking event, and thus, a secondary power source voltage is used to ensure the CAN transceiver remains on during the cranking event. The secondary power source voltage is plotted by a thick line 27 in the graph 22. The thick line 27 is linearly horizontal and has a slope of zero since the thick line 27 has a constant Y-axis valve of 9 volts. With the secondary power source voltage set at 9 volts, the CAN transceiver will remain on in the event of the cranking event as it is set above the minimum operating voltage of the CAN transceiver. Further seen by FIG. 3, a voltage of a VCAN (supply rail) is plotted by a long dash dot line 28 on the graph 22 (the long dash dot line 28 is shown with a second Y-axis to make it easier to visualize). The VCAN operates at 13.5 volts and during the cranking event, the VCAN voltage drops to 9 volts, as represented by a section 29 of the long dash dot line 28.

Those skilled in the art will appreciate that although embodiments disclosed herein provide voltage values of the CAN transceiver, main power source, secondary power source, and VCAN, the voltage values of the aforementioned devices may be any suitable range of values for operation of the system without departing from the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for a controller area network (CAN) transceiver of a motor vehicle, comprising:
   a main power supply, the main power supply being unregulated;
   a secondary power supply set above a minimum operating voltage of the CAN transceiver, the secondary power supply being regulated;
   a first diode, the first diode allowing the main power supply to power the CAN transceiver;
   a second diode, the second diode allowing the secondary power supply to power the CAN transceiver;
   wherein when the main power supply has a low cranking voltage below a normal operating voltage range, the first diode is reverse bias and the second diode is forward bias at the low cranking voltage, the secondary power supply powers the CAN transceivers at the low cranking voltage, thereby allowing the CAN transceiver to remain ON at the low cranking voltage.

2. The system of claim 1, wherein the minimum operating voltage range of the CAN transceiver is 6 volts.

3. The system of claim 2, wherein the main power supply powers the CAN transceiver at normal operating voltage range of 9 to 18 volts.

4. The system of claim 3, wherein the first diode is forward bias and the second diode is reverse bias at the normal operating voltage range of 9 to 18 volts.

5. The system of claim 1, further comprising a main switch between the main power supply and the secondary power supply.

6. The system of claim 1, wherein the CAN transceiver is grounded.

7. The system of claim 1, wherein the main power supply is an unregulated DC supply from an IGN switch or a battery.

8. The system of claim 1, wherein the secondary power supply further comprises a 5 volt buck-boost battery and/or boost battery.

9. The system of claim 1, wherein the motor vehicle comprises an automatic start/stop feature.

10. A method for using a redundant supply for a controller area network (CAN) transceiver of a motor vehicle, comprising:
    when a voltage of a main power supply is set to a low cranking voltage that is below a normal operating voltage range of the CAN transceiver:
      changing a first diode from a forward bias to a reversed bias at the low cranking voltage;
      switching a main switch at the low cranking voltage;
      transmitting a voltage of a secondary power supply through a second diode that is forward bias and to the CAN transceiver;
      powering the CAN transceiver using the secondary power supply at the low cranking voltage, the secondary power supply being a regulated power supply; and
    maintaining an ON status of the CAN transceiver at the low cranking voltage, wherein the CAN transceiver controls a main switch during an engine cranking event.

11. The method of claim 10, further comprising transmitting the voltage of the main power supply through a first diode being forward bias and to the CAN transceiver at a normal operating voltage range of 9 to 18 volts.

12. The method of claim 11, further comprising powering the CAN transceiver with a main power supply, the main power supply being unregulated.

13. The method of claim 10, further comprising grounding the CAN transceiver.

14. The method of claim 10, further comprising supplying the main power supply with voltage from an unregulated DC supply of an IGN switch or a battery.

15. The method of claim 10, further comprising supplying the secondary power supply with voltage from a 5 volt buck-boost battery and/or boost battery.

* * * * *